United States Patent
Kropp

(10) Patent No.: US 6,785,476 B1
(45) Date of Patent: Aug. 31, 2004

(54) TRANSMISSION CONFIGURATION

(75) Inventor: Jörg-Reinhart Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/520,279

(22) Filed: Mar. 6, 2000

(30) Foreign Application Priority Data

Mar. 4, 1999 (DE) .......................................... 199 11 433

(51) Int. Cl.$^7$ ........................ H04B 10/00; H04B 10/04; H04B 10/12; G02B 6/26; G02B 6/42

(52) U.S. Cl. ...................... 398/200; 398/182; 398/140; 398/141; 385/27; 385/32; 385/33; 385/38

(58) Field of Search ................................ 359/127, 131, 359/188; 385/27, 32, 33, 38; 398/182, 135, 140, 200, 141

(56) References Cited

U.S. PATENT DOCUMENTS

| | | | | |
|---|---|---|---|---|
| 3,981,590 A | * | 9/1976 | Perkins ........................ 356/178 |
| 4,742,014 A | | 5/1988 | Hooper et al. ............... 437/192 |
| 4,743,091 A | * | 5/1988 | Gelbart ........................ 350/252 |
| 4,805,179 A | * | 2/1989 | Harder et al. ................... 372/47 |
| 5,181,219 A | | 1/1993 | Mori et al. ..................... 372/46 |
| 5,181,221 A | | 1/1993 | Mori et al. ..................... 372/46 |
| 5,182,757 A | | 1/1993 | Mori et al. ..................... 372/45 |
| 5,233,188 A | * | 8/1993 | Arimoto et al. ............. 250/235 |
| 5,295,148 A | | 3/1994 | Mori et al. ..................... 372/46 |
| 5,317,584 A | | 5/1994 | Mori et al. ..................... 372/46 |
| 5,356,832 A | | 10/1994 | Mori et al. ................. 437/129 |
| 5,359,447 A | | 10/1994 | Hahn et al. .................. 359/154 |
| 5,404,369 A | | 4/1995 | Mori et al. ..................... 372/45 |
| 5,434,939 A | | 7/1995 | Matsuda ....................... 385/88 |
| 5,436,922 A | | 7/1995 | Mori et al. ..................... 372/46 |
| 5,537,666 A | | 7/1996 | Mori et al. ..................... 372/46 |
| 5,587,335 A | | 12/1996 | Mori et al. .................. 437/129 |
| 5,670,420 A | | 9/1997 | Choi ........................... 437/189 |
| 5,790,310 A | * | 8/1998 | Huang ......................... 359/618 |
| 6,010,603 A | | 1/2000 | Ye et al. ................. 204/192.35 |
| 6,027,860 A | | 2/2000 | McClure et al. ............ 430/314 |
| 6,044,188 A | | 3/2000 | Kropp .......................... 385/33 |
| 6,064,786 A | * | 5/2000 | Cunningham et al. ........ 385/38 |
| 6,353,491 B1 | | 3/2002 | Tanaka et al. |
| 6,356,574 B1 | * | 3/2002 | Craig et al. .................... 372/75 |

FOREIGN PATENT DOCUMENTS

| | | |
|---|---|---|
| DE | 29 30 317 C2 | 2/1981 |
| DE | 31 12 167 A1 | 10/1982 |
| DE | 34 06 424 A1 | 2/1985 |
| DE | 196 45 295 A1 | 4/1998 |
| DE | 198 38 571 A1 | 3/1999 |
| JP | 4 363 081 | 12/1992 |
| JP | 6 237 016 | 8/1994 |
| JP | 7 170 231 | 7/1995 |
| JP | 8 340 156 | 12/1996 |
| JP | 11 014 869 | 1/1999 |

OTHER PUBLICATIONS

P.L. Gourley et al.: "Coherent beams from high efficiency two–dimensional surface–emitting semiconductor laser arrays", Appl. Phys. Lett., vol. 58, No. 9, Mar. 4, 1991, pp. 890–892.

\* cited by examiner

*Primary Examiner*—M. R. Sedighian
(74) *Attorney, Agent, or Firm*—Laurence A. Greenberg; Werner H. Stemer; Ralph E. Locher

(57) ABSTRACT

A transmission configuration includes a plurality of individual lasers which are included in a two-dimensional laser array and emit radiation elements with coupled phases upon stimulation. The radiation elements enter a light-conducting core of a multimode optical conductor together.

6 Claims, 1 Drawing Sheet

TRANSMISSION CONFIGURATION

BACKGROUND OF THE INVENTION

Field of the Invention

The invention is in the field of optical data transmission with high transmission rates, through the use of multimode optical conductors. Such data transmission is based on the use of optical modules which include an electrooptical transmitter and/or receiver. The transmitter and/or receiver includes a module as an active component which is also referred to as an electrooptical transducer and which generates and emits (transmitter) light signals in the area of an optically active zone when stimulated electrically, and emits corresponding electrical signals (receiver) when light signals are applied to the optically active zone. Laser transmitters are being increasingly used in transmission modules, and are also suitable for satisfying economic aspects of increasingly stringent requirements for high-performance transmitters to generate short, high-quality optical signals or pulses.

The invention relates to a transmission configuration having a transmitter and a multimode optical conductor for passing on radiation emitted from the transmitter.

Such a transmission configuration is described in German Published, Non-Prosecuted Patent Application DE 196 45 295 A1, corresponding to U.S. application Ser. No. 09/301, 136, filed Apr. 28, 1999. In that known configuration, an intermediate, additional pin stub including a monomode optical conductor is used for injecting light into one end of a multimode optical conductor. One end surface of the pin stub is in contact with an end of the multimode optical conductor. The light to be injected (for example emitted by a laser diode) is focused onto another, free end surface of the pin stub.

On one hand, in view of the increasing requirement for very high data transmission rates, it is necessary when using a multimode optical conductor (for example to transmit the emitted light signals to a receiver disposed at the other end of the optical conductor) to optimally illuminate the light-carrying core of the multimode optical conductor. On the other hand, the signal response of the laser transmitter must also be such that a required signal form is maintained over a wide operating range. For example, when using square-wave pulses for data coding, the emitted light signal must have a square-wave form which is as ideal as possible, in order to ensure data transmission without bit errors, or at least with few bit errors.

In the known configuration described initially, the pin stub including the monomode optical conductor results in the number of stimulated modes in the downstream multimode optical conductor being reduced. In order to additionally preclude stimulation effects resulting from vagabond light in an outer surface of the pin stub, in order to achieve a wide bandwidth, the pin stub has a light-dissipating region, in which its outer surface is surrounded by an external coating composed of a material having a higher refractive index than the refractive index of the outer surface material.

The known configuration is structurally relatively complex due to the interposition of the pin stub, and does not allow modes to be deliberately stimulated on the end surface of the light-conducting core of the multimode optical conductor or in specific, preferred regions of the core cross section. Since, however, by virtue of the production techniques, the light-conducting core may have poorer light-conduction characteristics in the center and only smaller amounts of light can be transported than in the region where the radii are greater, it is desirable to deliberately stimulate the core in peripheral regions.

SUMMARY OF THE INVENTION

It is accordingly an object of the invention to provide a transmission configuration which overcomes the hereinafore-mentioned disadvantages of the heretofore-known devices of this general type.

With the foregoing and other objects in view there is provided, in accordance with the invention, a transmission configuration, comprising a transmitter for emitting radiation, the transmitter having a plurality of individual lasers in a two-dimensional laser array, the individual lasers emitting radiation elements with coupled phases upon stimulation; and a multimode optical conductor for passing on the radiation emitted from the transmitter; the radiation elements entering the multimode optical conductor together.

Laser transmitters which are suitable for this purpose and include a plurality of individual lasers are known per se in conjunction with the investigation of fundamental physical characteristics of lasers, for example from an article entitled "Coherent Beams From High Efficiency Two-Dimensional Surface-Emitting Semiconductor Laser Arrays" by P. L. Gourley et al., Applied Physics Letters 58 (9), 4 Mar. 1991, pages 890–892. That article describes two-dimensional configurations of lasers which are operated non-actively but are stimulated by so-called "photopumps" to emit radiation. The description covers close fields and far fields which are produced. The article does not include any further information relating to active operation of such a laser array in particular for data transmission at high transmission rates.

A major aspect of the present invention, on the other hand, is the simultaneous active operation of a plurality of individual lasers actuating in parallel, for example using the same electrical control signal, which are disposed at a short distance of, for example, 1 to 2 $\mu$m from one another. The configuration of the individual lasers in a common configuration ("array") may be achieved, for example, by structuring the upper and/or lower laser mirror in a vertically emitting laser (VCSEL). In practice, it has been found in that case that even a minor difference in the reflection levels, for example 99.5% in the region of the individual lasers to 98% in the other regions located in between, is sufficient in order to define individual lasers. An alternative or additive option for structuring is to construct electrodes for actuation of the individual lasers as masks, or to structure the active region appropriately. A further major aspect of the configuration according to the invention is that the individual lasers also have the same dynamic response, by virtue of their identical geometries and production processes.

The close proximity of the individual lasers results in the lasers being coupled to one another, in such a manner that a higher-order, two-dimensional, phase-coupled oscillation state is produced. In this oscillation state, it is possible to emit a single mode longitudinally and transversely. The invention makes use of the knowledge that this monomode characteristic leads to a modulation response which provides an advantageous pulse shape for digital transmission, and thus represents a significant improvement in the transmission rates and the transmission capacity.

With such a configuration of individual lasers, it is possible to produce a far field, through the use of which the bandwidth of a multimode optical conductor can be utilized particularly well.

In accordance with another feature of the invention, particularly good utilization of the transmission characteristics of a multimode optical conductor can be advantageously achieved by causing the radiation elements to enter symmetrically about the optical axis of the multimode optical conductor.

In accordance with a further feature of the invention, the geometrical configuration of the individual lasers, in particular in a 2*2 matrix, allows beamforming through the use of a beamforming element disposed between the transmitter and one end of the multimode optical conductor.

In accordance with a concomitant feature of the invention, beamforming is carried out in such a way that the emitted radiation enters predominantly away from the core center, to be precise, in a particularly preferred manner, in the region between 10% and 50% of the core radius. Due to the production and selection processes used for multimode optical conductors, a particularly high transmission rate is normally achieved in this region.

Other features which are considered as characteristic for the invention are set forth in the appended claims.

Although the invention is illustrated and described herein as embodied in a transmission configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
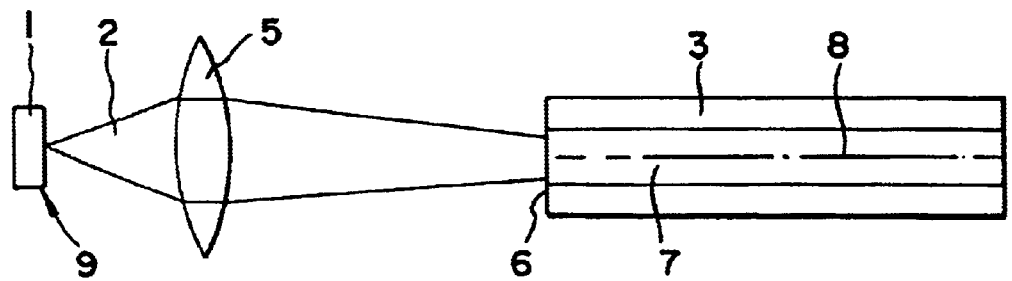
FIG. 1 is a diagrammatic, elevational view of a transmission configuration according to the invention.

Referring now to the figures of the drawings in detail and first, particularly to FIG. 1 thereof, there is seen a transmission configuration which includes a laser transmitter 1 that emits radiation 2 when electrically actuated in a manner which is known per se. The radiation 2 passes through a beamforming element, in the form of a lens 5, on its way to a multimode optical conductor 3. This broadens the radiation 2, which then arrives at an end surface 6 of a light-conducting core 7 of the multimode optical conductor 3. As will be explained in more detail in the following text, the radiation 2 actually includes a plurality of radiation elements from individual lasers, which are in a phase-coupled oscillation state. The optical conductor 3 has a central optical axis 8. A radiation-emitting end surface 9 of the transmitter 1 is shown considerably enlarged in FIG. 2.

Figure 2:
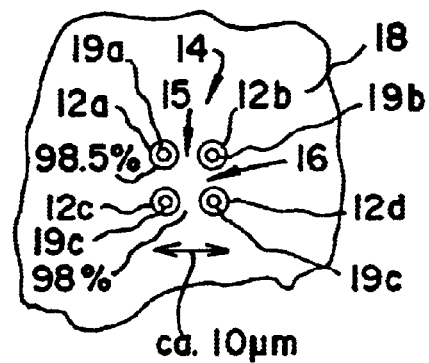
FIG. 2 is a fragmentary, elevational view illustrating emission characteristics for a laser array in a 2*2 matrix.

FIG. 2 shows individual lasers 12a to 12d disposed in a 2*2 matrix and having diameters that are each approximately 3 to 5 $\mu$m. The individual lasers 12a to 12d are disposed in a common laser array 14 and emit appropriate light signals (laser pulses) when actuated electrically. Inactive regions 15, 16, which functionally isolate the individual lasers from one another, are located between the lasers (for example the lasers 12a and 12b). This isolation can be achieved, for example, by mirror layers that are applied in order to constitute the individual lasers being mirrored to a greater extent in the region of the lasers (with 99.5%, for example), and by the intermediate regions 15, 16 being mirrored to a slightly lesser extent (for example with 98%). The structuring and separation of the individual lasers can, however, also be achieved by also using appropriate electrodes for actuation as masks, and by covering the intermediate regions 15, 16.

The individual lasers may be produced on a common substrate or base material 18. The production of suitable laser arrays is described, for example, in the article mentioned initially in Applied Physics Letters 58 (9), 1991, pages 890 to 892. If the individual lasers 12a to 12d are operated in parallel with the same control signal, the close proximity of the lasers to one another results in the lasers being coupled to one another, and thus in coupling of laser-specific radiation elements 19a to 19d, as is merely indicated diagrammatically in FIG. 2. This coupling results in the production of a higher-order, two-dimensional and phase-coupled oscillation state, which facilitates the emission of a single mode longitudinally and transversely. This monomode characteristic leads to a modulation response which provides a suitable pulse shape for digital data transmission.

Figure 3:
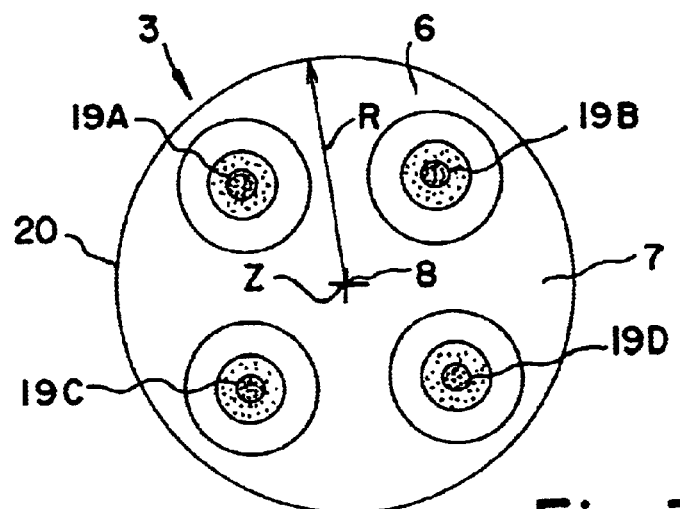
FIG. 3 is an elevational view of a matrix image as shown in FIG. 2, which is enlarged by an optical element, on a light-conducting core of a multimode optical conductor.

As FIG. 3 shows, the beamforming element 5 shown in FIG. 1 results in an image of the laser array illustrated in FIG. 2 being produced on the end surface 6 of the core 7 of the multimode optical conductor 3. A periphery 20 shown in FIG. 3 indicates a boundary of the light-conducting core 7 which, in conventional multimode optical conductors, has a diameter of approximately 62.5 $\mu$m. The configuration described above results in the individual radiation elements 19a to 19d shown in FIG. 2 being imaged symmetrically about a core center Z or about a central longitudinal axis 8 (optical axis) as radiation spots 19A to 19D in a region of approximately 10 to 50% of a core radius R originating from the core center Z. This coupling allows the bandwidth of the multimode optical conductor to be utilized particularly well.

The invention therefore envisages a configuration using phase-coupled, monomode individual lasers for transmitting data in multimode optical conductors. This results in the advantages of a monomode characteristic with respect to the modulation response, on the one hand, combined with deliberate stimulation of higher modes in the periphery of the core of a multimode optical conductor, on the other hand, using very simple measures.

I claim:

1. A transmission configuration, comprising:

a transmitter for emitting radiation, said transmitter having a plurality of individual lasers in a two-dimensional laser array, said individual lasers emitting radiation elements with coupled phases upon stimulation, said individual lasers being operated simultaneously; and a multimode optical conductor for passing on the radiation emitted from said transmitter, said multimode optical conductor having a core with a core center;

said radiation elements entering said multimode optical conductor together, said radiation elements entering symmetrically about an optical axis of said multimode optical conductor;

the emitted radiation entering said core predominantly away from said core center.

2. The transmission configuration according to claim 1, including a beamforming element through which said radiation elements pass before entering said multimode optical conductor.

3. The transmission configuration according to claim 2, wherein said beamforming element enlarges an optical image of said individual lasers on said core, causing the emitted radiation to enter predominantly away from said core center.

4. The transmission configuration according to claim 3, wherein said core has a core radius, and the emitted radiation enters predominantly in a region between 10% and 50% of said core radius.

5. The transmission configuration according to claim 1, wherein said individual lasers are disposed at a distance of 1 to 2 μm from one another.

6. The transmission configuration according to claim 1, wherein said two-dimensional laser array is formed by a structured laser mirror having a reflection level differing in regions of said individual lasers from other regions located in between said regions of said individual lasers.

* * * * *